US012570040B2

(12) United States Patent (10) Patent No.: US 12,570,040 B2
Schmitt et al. (45) Date of Patent: Mar. 10, 2026

(54) METHOD OF 3D PRINTING A SHOE PART AND RESULTING SHOE PART

(71) Applicant: Zellerfeld R&D GmbH, Hamburg (DE)

(72) Inventors: Cornelius Schmitt, Neustadt (DE); Antun Lovro Brkić, Halstenbek (DE); Ole Kröger, Hamburg (DE); Marc Patrick Schömann, Schenefeld (DE)

(73) Assignee: Zellerfeld R&D GmbH, Hamburg (DE)

( * ) Notice: Subject to any disclaimer, the term of this patent is extended or adjusted under 35 U.S.C. 154(b) by 0 days.

(21) Appl. No.: 19/275,791

(22) Filed: Jul. 21, 2025

(65) Prior Publication Data

US 2025/0345988 A1 Nov. 13, 2025

Related U.S. Application Data

(63) Continuation of application No. PCT/EP2025/050774, filed on Jan. 14, 2025.

(30) Foreign Application Priority Data

Feb. 9, 2024 (EP) .................................... 24156919

(51) Int. Cl.
B29C 64/118 (2017.01)
B33Y 10/00 (2015.01)
(Continued)

(52) U.S. Cl.
CPC ............ B29C 64/118 (2017.08); B33Y 10/00 (2014.12); B33Y 80/00 (2014.12); B29K 2101/12 (2013.01); B29L 2031/505 (2013.01); B33Y 30/00 (2014.12)

(58) Field of Classification Search
CPC ....... B29C 64/118; B33Y 10/00; B33Y 80/00; B33Y 30/00; B29K 2101/12; B29L 2031/505
See application file for complete search history.

(56) References Cited

U.S. PATENT DOCUMENTS 8,844,167 B2 9/2014 Greene
9,788,607 B2 10/2017 Waatti
(Continued)

FOREIGN PATENT DOCUMENTS

DE 102015212099 A1 12/2016
DE 202017103049 U1 6/2017
(Continued)

OTHER PUBLICATIONS

PCT/EP2021/085762 International Search Report and Written Opinion dated Mar. 31, 2022.
(Continued)

*Primary Examiner* — Monica A Huson
(74) *Attorney, Agent, or Firm* — Wilson Sonsini Goodrich & Rosati

(57) ABSTRACT

The invention relates to 3D printing of a shoe part (100) with a plurality of different printing layers (10), wherein said shoe part is made by additive layer-by-layer printing. Each printing layer (10) defines an outer section (11) of the shoe part, an inner section (12) of the shoe part and an intermediate section (13) which connects the outer section (11) and the inner section (12) by an infill structure (30), wherein and said infill structure (30) comprising infill connecting lines (31) and/or infill connecting structures (32). According to the novel approach of the present invention, no predetermined standard infill structures are used but rather the orientations of the infill connecting lines (31) and/or the
(Continued)

infill connecting structures (32) are determined based on the outer section (11) of the part of the individual shoe.

30 Claims, 5 Drawing Sheets

(51) Int. Cl.

| | | |
|---|---|---|
| *B33Y 80/00* | (2015.01) | |
| *B29K 101/12* | (2006.01) | |
| *B29L 31/50* | (2006.01) | |
| *B33Y 30/00* | (2015.01) | |

(56) References Cited

U.S. PATENT DOCUMENTS

| | | | |
|---|---|---|---|
| 9,914,274 | B2 | 3/2018 | Jones et al. |
| 10,241,498 | B1 | 3/2019 | Beard et al. |
| 11,097,501 | B2 | 8/2021 | Jones et al. |
| 11,358,340 | B2 | 6/2022 | Sterman et al. |
| 11,425,961 | B2 | 8/2022 | Sterman et al. |
| 11,584,084 | B2 | 2/2023 | Miller |
| 11,993,048 | B2 | 5/2024 | Jones et al. |
| 12,226,973 | B2 | 2/2025 | Jones et al. |
| 2015/0351493 | A1 | 12/2015 | Ashcroft et al. |

| | | | | |
|---|---|---|---|---|
| 2017/0066196 | A1 | 3/2017 | Beard et al. | |
| 2017/0129172 | A1 | 5/2017 | Waatti et al. | |
| 2023/0337783 | A1 | 10/2023 | Hatano et al. | |
| 2024/0383202 | A1 | 11/2024 | Baggen et al. | |
| 2025/0135740 | A1 | 5/2025 | Jones et al. | |
| 2025/0221493 | A1 * | 7/2025 | Hoeck, III | .......... A43B 13/181 |

FOREIGN PATENT DOCUMENTS

| | | |
|---|---|---|
| EP | 3229637 A1 | 10/2017 |
| EP | 3685988 A1 | 7/2020 |
| EP | 3845087 A1 | 7/2021 |
| EP | 4408232 A1 | 8/2024 |
| WO | WO-2022136031 A1 | 6/2022 |
| WO | WO-2024238816 A1 | 11/2024 |

OTHER PUBLICATIONS

PCT/EP2024/071335 International Search Report and Written Opinion dated Mar. 11, 2025.
PCT/EP2025/050774 International Search Report and Written Opinion dated Mar. 8, 2025.
EP24156919.3 Office Action dated Apr. 30, 2025.
Nachtigall, Troy Robert. et al. Towards Ultra Personalized 4D Printed Shoes. Human Factors in Computing Systems :1-9 (2018).

* cited by examiner

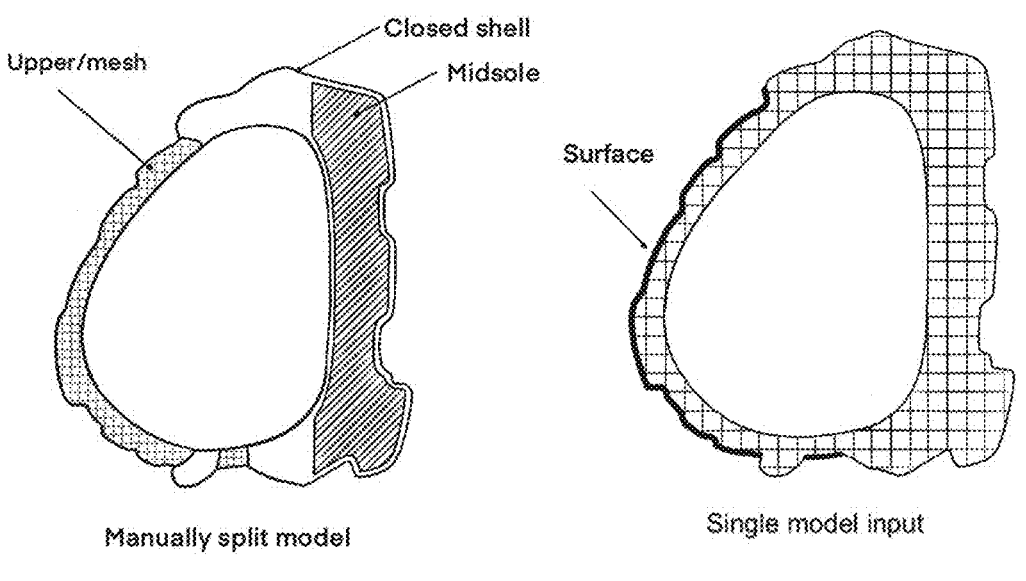
Fig. 2a
Fig. 2b
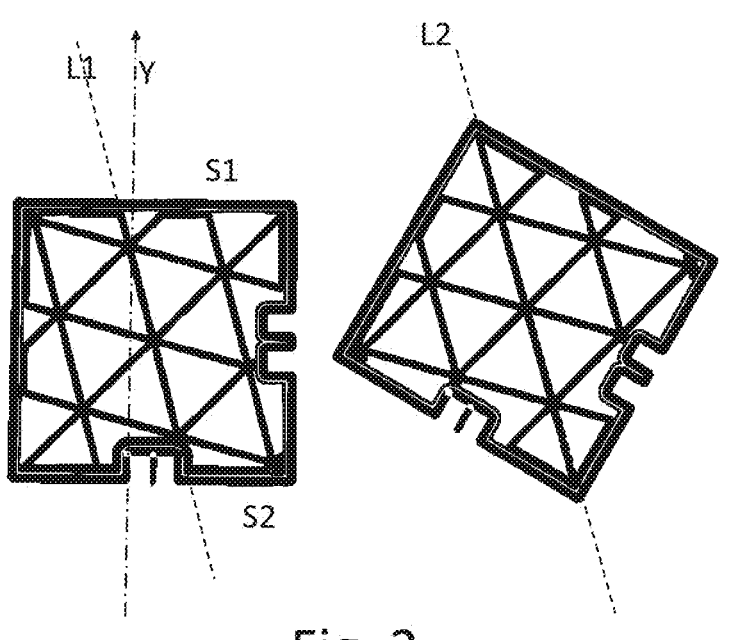
Fig. 3
Prior art

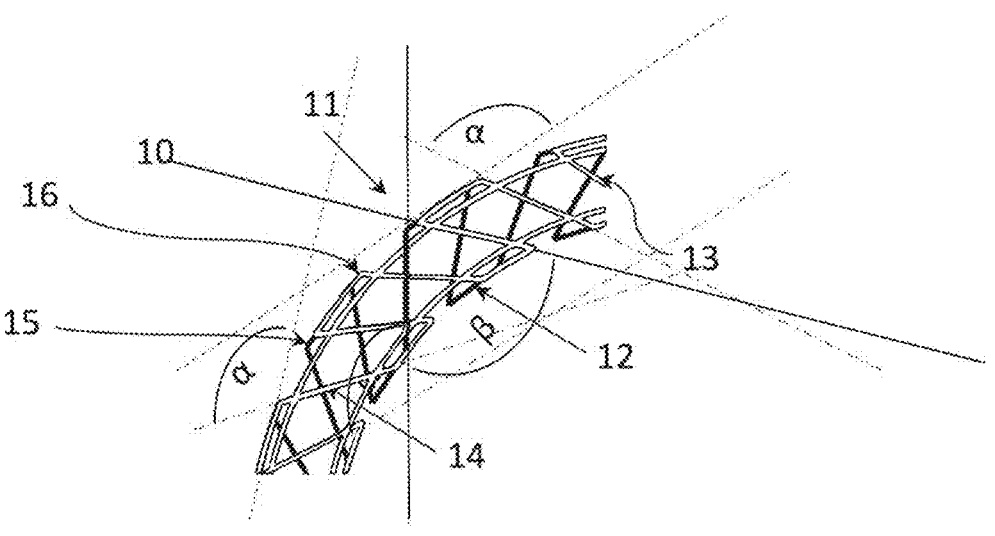
Fig. 4
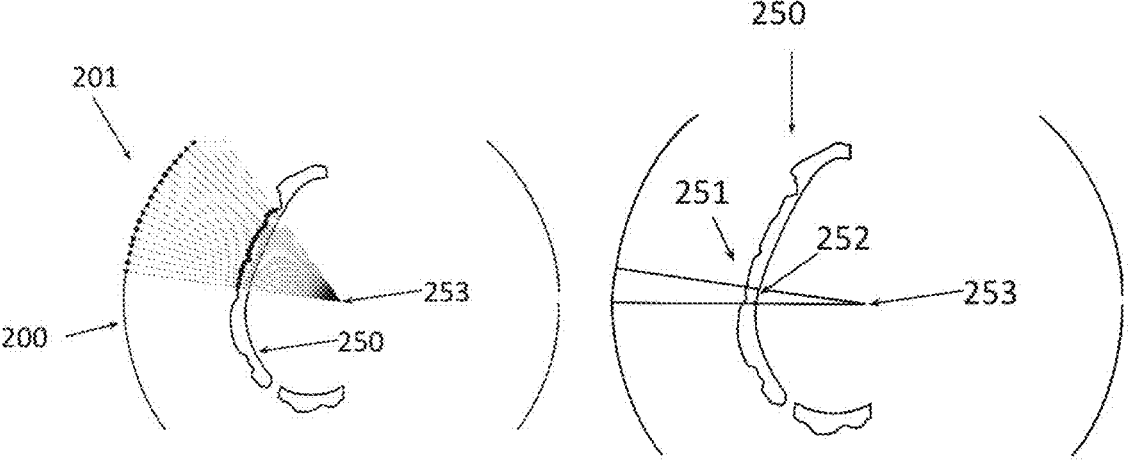
Fig. 5a                    Fig. 5b

METHOD OF 3D PRINTING A SHOE PART AND RESULTING SHOE PART

CROSS-REFERENCE TO RELATED APPLICATIONS

This application is a continuation of PCT International Application No. PCTEP2025050774, filed Jan. 14, 2025, which claims the benefit of priority of European Patent Application No. EP 24156919.3, filed Feb. 9, 2024, the contents of which are incorporated herein by reference in their entirety.

TECHNOLOGY OF THE PRESENT INVENTION

The present invention relates to a new method for 3D printing a part of a shoe, preferably an upper of a shoe, an apparatus for such printing and a method for calculating and controlling such printing. The present invention also relates to the resulting shoe which provides a predetermined outer appearance and/or softness or flexibility.

BACKGROUND 3D printing is often used to produce parts that could just as easily be made using another manufacturing technique. While the end result may look the same, it is the inside that is often important.

One benefit of 3D printing is the ability to vary the hollowness of a part. In manufacturing terms, a hollow part requires less time and material than a solid one, thereby reducing the overall weight, production time and costs. The inside of a 3D print is called infill, and it can be adjusted in terms of density of volume: 0% is hollow while 100% is solid. Furthermore, how a part is filled in can be adjusted according to a wide variety of infill patterns.

The inventors of the present invention already filed the application WO 2022/136031 A1 which relates to a shoe consisting of at least one upper and at least one sole, the upper and the sole being made as a single piece from at least one thermoplastic material in a 3D printing process. The upper and the sole have different structures.

Now, the inventors have discovered a new design of infill pattern that significantly affects the appearance and softness of the outer surface of the printed article. Before discussing the new method and design, known prior art infill patterns will be briefly discussed.

3D printing software typically provides different types of infill for use. For example, known infills may be grouped in infills for models and figures with the following pattern: lightning, lines, zig-zag, grid, triangles, hexagons, cubic, octets, quarter cubic etc. For instance, FIG. 1 shows a cross-section of a 3D printed prior art shoe as already discussed in the previous application WO 2022/136031 A1. In particular, the cross section is taken along the XY plane, i.e., along a printing layer. Here, the shoe is printed from front to back or the other way around. The shoe comprises an outer section 1 (or outer layer), an inner section 2 (or inner layer) and an intermediate section 3 between the outer and inner sections. In particular, a regular infill in the form of a honeycomb structure is provided between the outer section 1 and the inner section 2, wherein said honeycomb structure has a regular pattern throughout the entire printing layer and also throughout a plurality of adjacent printing layers. In other words, each honeycomb of the honeycomb structure is oriented exactly the same regardless of the outer/inner shape of the outer/inner sections 1, 2.

By providing a continuous outer layer 1 and a continuous inner layer 2, the outer appearance of the shoe upper is determined. The stiffness or flexibility of the article can be controlled by the material used, the wall thicknesses of the outer/inner layers, the wall thickness of the infill structure, but also by the infill pattern.

Typically, a shoe comprises two main components, the shoe upper (upper part) and the shoe bottom (sole). In particular, a sole typically comprises an insole, a midsole and an outsole. The midsole is usually used for cushioning, while the outsole is essentially an abrasion-resistant layer. In general, the soles are designed in such a way as to provide a high level of stability on the one hand and to absorb the impact load when the foot strikes the ground on the other. Moreover, in order to produce a comfortable shoe using 3D printing, it is desirable that at least the upper shoe has a certain degree of flexibility.

To achieve some flexibility of a 3D printed article, it is known to use flexible filaments for printing a flexible infill pattern, i.e., to preserve some flexible nature of the entire print. Infill patterns like concentric, cross and cross 3D are known to provide some flexibility.

All of these known infill patterns provide some sort of regular pattern that is typically independent of the outer contour of the article. For instance, infill directions are often chosen to provide a plurality of 45° lines in the XY printing plane so that both the X and Y motors work together to print infill at maximum speed. However, it may be advantageous to orient the infill at different angles in order to provide maximum strength or flexibility to the part, especially if its walls are diagonally-aligned.

Especially in the technical field of 3D printing of shoes, there are different approaches that offer some advantages but also some disadvantages. Previous approaches compromise on breathability or aesthetics. Open outer shells with open infill structures create breathability, but do not represent the model well (fine footwear design lines often get lost in an open mesh structure). Closed shell structures, on the other hand, represent the model perfectly but offer no breathability. Previous approaches fail to create a textile feel. Previous approaches also fail to create consistent patterns and properties (e.g., due to simple grid projection of infill structures, softness can vary depending on the direction of force and location in the XY plane).

The present invention provides a new method for constructing an infill pattern that provides improved control of the flexibility and/or appearance of the printed article with an irregular infill pattern which is preferably determined based on the contour of the article to be printed, preferably determined by the outer contour and/or inner contour of the article.

SUMMARY OF THE INVENTION

The subject-matter of the present invention is defined by the features of the independent claims. Further embodiments are defined in the dependent claims.

The following aspects are useful for the understanding of general ideas of the present invention.

1. A method for 3D printing a part of a shoe, in the following also called shoe part or shoe model, with a plurality of different printing layers, the method comprising:
   additively printing the part of the shoe by a layer-by-layer method,
   wherein each printing layer defines an outer section (also called outer surface or outer shell) of the shoe part, an inner section (also called inner surface or inner shell) of the shoe part and an intermediate section which connects the outer section and the inner section by an infill structure (also called infill pattern), said infill structure comprising infill connecting lines and/or infill connecting structures, wherein the orientations of the infill connecting lines and/or the infill connecting structures are determined based on the outer section of the part of the shoe and/or the inner section of the shoe part.

Individual layers of the additive printed layers can be numbered as n and n+1, where n+1 is the layer printed directly on top of layer n. Similarly, layers n and n+2 refer to two layers with layer n+1 sandwiched between layers n and n+2.

It is preferred that the outer shell and/or the inner shell is printed with an open structure such that the outer shell comprises some openings or gaps. The method of the present invention constructs therefore printing points on the outer shell and preferably subsequently constructs the orientation of the infill pattern based on these printing points on the outer shell. Alternatively, or additionally the method of the present invention starts with the construction of printing points on the inner shell of the shoe part, i.e., the portion of the shoe which contacts the foot of a person.

In the following, the shoe part of the entire shoe is printed from front to back, i.e. from the toe area to the heel area of a shoe, or vice versa, which is used as the default printing direction. In other words, the print direction defines the Z axis of the 3D printer and each printed layer is located in the XY plane, where the XYZ axis defines a rectangular coordinate system.

A person skilled in the art will appreciate that the shoe portion and/or the entire shoe can be printed along any other direction of the shoe, e.g. from the bottom (sole part) to the shoe upper or even "diagonally" along any direction through the shoe, which is not necessarily the Z, X or Y axis.

According to a preferred embodiment of the present invention, the outer section of the shoe should be printed to provide a preferred outer appearance such that the orientation of the infill is constructed based on the outer section. In general, a plurality of points is constructed on the outer portion (outer surface) of the shoe, with a plurality of these points being used as start, end, or vertex points for the construction of the infill. There are several methods for constructing the plurality of outer points, which will be discussed in more detail below.

According to another preferred embodiment of the present invention, the inner section of the shoe may be printed to provide a desired comfort for the foot inside the shoe. The orientation of the infill may be constructed based on the inner section. Similar to the construction based on the outer section, a plurality of points are constructed on the inner portion (inner surface) of the shoe, with a plurality of these points being used as start, end, or vertex points for the construction of the infill.

According to still a further embodiment, the outer section and the inner section are used as basis for the construction of the infill, especially the orientation of infill construction lines which determine not only the appearance of the shoe part but also the stiffness or flexibility. Accordingly, a plurality of points is constructed on the inner portion and outer portion of the shoe, with a plurality of these points being used as start, end, or vertex points for the construction of the infill.

2. The method as discussed above, wherein orientations of the infill connecting lines and/or the infill connecting structures are determined based on the outer section and/or the inner section, wherein preferably a combination of a point on the outer section together with an associated point on the inner section defines the orientation of the infill connecting line.

3. The method of any of the preceding aspects, wherein a desired softness/flexibility of the part of the shoe defines the angles ($\theta$) between the infill connection lines and an axis perpendicular to the outer section, wherein the angle ($\theta$) is chosen larger if the softness is desired greater.

4. The method of any of the preceding aspects, wherein the part of the shoe comprises at least a first region and a second region directly adjacent to the first region along the direction of the outer region, wherein the angles ($\theta$) between the infill connection lines and an axis perpendicular to the outer section of the first region are larger than the angles ($\theta$) of the second region, such that first region is softer/more flexible than the second region. These two regions may be located in the same printing plane and/or in adjacent printing planes.

5. The method of aspect 3 or aspect 4, wherein the angles ($\theta$) are in a range between 45° and 75°, more preferably in a range between 55° and 65°.

6. The method of any of the preceding aspects, wherein a flexible filament is used for printing, preferably a thermoplastic material, further preferred Thermoplastic Polyurethane (TPU), Thermoplastic Elastomers (TPE), Polypropylene (PP), Nylon, Flexible Polyurethane, Thermoplastic Copolyester (TPC), and various bio-based polymers.

7. The method of any of the preceding aspects, wherein the orientations of the infill connecting lines and/or connecting structures are calculated on a layer by layer basis, such that an angle ($\beta$) between a first infill connecting line of a first layer and a second infill connecting line of a second layer is preferably in the range between 80° and 140°, preferably between 100° and 120°, wherein the first layer is directly adjacent to the second layer.

8. The method of any of the preceding aspects, wherein an infill density is defined by dividing the volume of the printed material by the total volume, wherein the infill density is between 15% and 40%.

9. The method of any of the preceding aspects, wherein for the determination of the orientations of the infill connecting lines, a first point cloud is generated on an outer contour line, preferably regarding a single layer or outer contour surface regarding a plurality of printing layers, which is outside of the shoe part. Preferably, said outer contour line or outer contour surface surrounds the part of the shoe part.

10. The method of any of the above aspects, wherein from preferably each point of the first point cloud a corresponding outer point on the outer section of the shoe part is mapped or constructed. According to another embodiment, the first point cloud could also have more points than points mapped on the shoe part or even less points. This mapping or construction of points on the outer surface of the shoe from "virtual" points of a template outside (the point cloud) of the finally printed shoe provides e.g. the advantage that the general design of the shoe part, and therefore the structure of the infill, adjusts automatically to different shoe sizes and shapes.

The outer points, i.e., the points on the outer section (outer shell) of the shoe part, which preferably form start, end and/or vertex points for the infill structure or infill connection lines, may also be constructed without the first point cloud and also without projection mapping, as explained in more detail below.

In contrast thereto, in the prior art rather static infill structures are used such that different sizes of shoes or lead to different infill structures. Still in other words, according to the present invention, the infill structures of a small shoe and a larger shoe are similar. Here the term similar should be understood in a mathematical sense. In particular, two objects (Including the infill geometry) are similar if they have the same shape, or if one has the same shape as the mirror image of the other or the similar object can be obtained by translation, rotation, reflection and/or scaling of the other object. For the construction of the outer points of the shoe part, it is preferred to construct the first point cloud based on an outer contour line for a printing layer. For instance, for each printing layer, a different contour line for the cloud points may be constructed. For a plurality of adjacent printing layers, it is further preferred to use an outer contour surface for the point cloud. Said contour line may be a circle or a ellipse or another geometrical form. Moreover, in case a contour surface, preferably a continuous surface is used for a plurality of printing layers, it is preferred to use a cylinder, preferably a cylinder with a circular cross section. This cross section is preferably circular in the X-Y plane of a printer, wherein the printing of the individual layers is performed along the Z-direction, as usually defined in 3D printers.

11. The method of any of the above aspects, further comprising using a second point cloud. In the simplest case, the second point cloud contains only one point, for example a central point arranged in the middle of the shoe model. The second point cloud, however, may comprise two, three, four or even a plurality of second points. The second point cloud is preferably located somehow central with regard to the entire shoe model. In other words, the points of the second point cloud are preferably located adjacent to the inner section external from the intermediate section, which basically corresponds to the inner part or inside of the shoe model. This or these point(s) of the second point cloud are preferably used to determine corresponding inner points on the inner section/inner surface of the shoe part.

12. The method of any of the above aspects, wherein the infill connecting lines connect an outer point across the intermediate section with an inner point, wherein the connecting lines, also called infill connection lines or infill connecting lines, between paired points on the shoe model surfaces define an angle ($\alpha$) of an infill connection line. Said angle preferably defines the softness or rigidity of the shoe part and/or the outer appearance. Accordingly, it is hard to limit these angles to a specific range. For a typical softness as desired in the technical field of shoes, however, the inventors noted that most of the angles, i.e., more than 50% of the angles are within the range of 130° to 160°. These angles, however, are also dependent on the used material and on the thickness of the printed line within the layer.

13. The method of any of the preceding aspects comprising the step of generating a plurality of outer points on the outer section/surface of the shoe part of a shoe model to determine infill structure and the orientations of the infill connecting lines. These outer points may be constructed by projection methods, as discussed above, or may be constructed directly on the outer section. In other words, these outer points may be considered as defining key positions across the outer shoe structure. Preferably each point of the plurality of outer points is mapped to a corresponding point on an enlarged or reduced actual shoe model to be printed, thereby adjusting the design to different shoe sizes and shapes.

14. The method of any of the above aspects, wherein said angle ($\alpha$) varies across the surface of the shoe model and/or in different layers, preferably in each adjacent layer, each third layer, etc., to achieve a desired stiffness and/or external appearance. For example, it can be advantageous if the side walls of an upper shoe are somewhat stiffer in order to maintain the contour of the shoe. The upper side of an upper shoe may be slightly softer, for example, in order to achieve greater comfort.

15. The method of any of the preceding aspects, wherein the external appearance of the shoe part is a mesh-like structure, derived from the mapped points and connection lines on its surface, 16. The method of any of the preceding aspects, wherein the outer appearance of the outer section is a mesh-like structure.

17. The method of any of the preceding aspects, wherein the printing result of the part of the shoe is independent from the orientation of the shoe part with regard to an X-Y-base of the 3D printer since the outer and inner section/surface of the shoe part determine the structure of the infill.

18. The method of any of the preceding aspects, wherein the part of the shoe is a shoe upper or an entire shoe. It is preferred that the entire shoe is printed as a single entity, wherein the method of the present invention is at least used for printing a shoe upper. In other words, the infill pattern of the remaining parts of the shoe, e.g., the midsole or sole may be constructed differently from the shoe upper, such that known techniques from the art may be used for these remaining parts of the shoe. For instance, these other remaining parts of the shoe may comprise regular infill pattern.

19. The method of any of the preceding aspects, wherein the arrangement of the printed layers includes the periodic introduction of closed layers at intervals ranging from every $2^{nd}$ to every $5^{th}$ layer. Preferably, a closed layer comprises a single outer wall and preferably a single inner wall. Preferably these outer wall and inner wall are connected by a loop within the printing layer such that a closed loop in the layer is created.

In particular, a closed layer relates to a layer which comprises preferably a continuous line of printed material along the outer surface section. In other words, in case a plurality of closed layers are printed adjacent to each other layer, the outer appearance creates a continuous "closed" surface. According to the present invention, which preferably generates an outer surface with a meshed-like appearance, a plurality of layers are not closed. The differences between closed and non-closed layers will become clearer below in conjunction with the drawings.

The variation of closed and not closed layers, i.e. the layering pattern, is different from the known standard approach of uniformly repeating infill layers. This method of layering pattern does not only change the outer appearance of the printed produce but also changes and preferably enhances the mechanical properties and contributes to the unique design and performance characteristics of the shoe.

20. The method of any of the preceding aspects, wherein the shoe part incorporates a range of thicknesses from 2 mm to 10 mm, preferably to ensure that the angles of the infill connecting lines can effectively connect to the inner surface. In other words, it is preferred that the method of the present invention is used for shoe parts with a thickness between 2 mm and 10 mm. It may be preferred that parts of the shoe model that exceed 10 mm in thickness, these thicker sections are treated as distinct regions, and these sections may be printed with a different approach, e.g, with an infill pattern as known in the art, e.g. with closed shell. In other words, printing the entire shoe based on different approaches, e.g., printing the shoe upper using the present method and printing the remaining parts of the shoe using known infill printing methods, can provide improved structural integrity and design consistency across varying thicknesses within the shoe model.

21. The present invention relates not only to a printing model, but also to the calculation of the infill pattern prior to printing. According to a further aspect, the present invention relates to a method for calculating a printing pattern of 3D printing of a part of a shoe, wherein for each layer an outer section of the shoe part, an inner section of said shoe part and an infill structure between the outer section and inner section are calculated. The geometry of said infill structure is preferably calculated individually for each layer on the basis of the outer section and the inner section such that the angle (α) of an infill connection line is determined by the line of the contour of the outer section.

22. A further aspect relates to a method for 3D printing an (entire) shoe, wherein the method according to the above discussed aspects is at least used to print an upper of the shoe.

23. Still a further aspect of the invention relates to method for slicing a virtual object of a part of a shoe for generating G-code for 3D printing the part of a shoe with a plurality of different printing layers, wherein each calculated sliced layer defines an outer section of the shoe part, an inner section of the shoe part and an intermediate section which connects the outer section and the inner section by an infill structure, said infill structure comprising infill connecting lines and/or infill connecting structures. The novel approach of the present invention can be seen in the fact that the orientations of the infill connecting lines and/or the infill connecting structures are determined based on the outer portion of the shoe part.

24. A further aspect of the present invention relates to an apparatus for fabricating a three-dimensional object from a representation of the object stored in memory, the apparatus comprising: a 3D printing head with a nozzle and an extruder for extruding thermoplastic material; a control means for 3D printing according to a method according to any of aspects 1-20, wherein the object is a part of a shoe.

25. Still a further aspect of the present invention relates to the produced product with special characteristics, particularly a part of a shoe produced by a 3D printing method according to the method of the present invention.

26. A further aspect relates to a computer program in combination with an apparatus according to aspect 24, said computer program comprising instructions which, when the program is executed by a computer, cause the apparatus to carry out the method according to any of aspects 1 to 20.

27. A computer-readable data carrier comprising instructions which, when executed by a computer of the apparatus according to aspect 22, cause the computer and the apparatus to carry out the method according to any of aspects 1 to 18.

The general idea of the present invention is best understood by the novel approach of how the infill pattern together with the outer layer and preferably also the inner layer of a shoe part is printed. In general, the present invention relates to a method for 3D printing a part of a shoe (hereinafter also referred to as a "shoe part" or "shoe model") with a plurality of different printing layers. The method comprises the steps of additively printing the part of the shoe layer-by-layer, wherein each printing layer defines an outer section of the shoe part, an inner section of the shoe part and an intermediate section which connects the outer section and the inner section by an infill structure. By layer-by-layer printing according to the present invention, the special appearance of the outer shoe surface is possible and individually designable. Since the outer surface of a shoe part printed by the method of the present invention preferably comprises a mesh-like structure, the term "outer surface" should be understood as a surface which is preferably not fully closed, e.g., in contrast to known rubber boots.

In other words, the outer sections of each printing layer form the outer surface of the shoe part, wherein the "surface" is not a totally flat closed surface but preferably a structured surface, e.g., like a textile surface. This outer section or outer surface may also be referred to as "exterior wall" of the shoe part.

The infill structure comprises infill connecting lines and/or infill connecting structures. The specific construction of the infill structure of the present invention differs from known prior art infill structures, which are typically regularly designed, e.g., to achieve light weight or enhanced stiffness. By the specific infill structure, the properties of the outer section of the shoe and/or the outer appearance are specifically controllable. Accordingly, the orientations of the infill connecting lines and/or the infill connecting structures are preferably determined based on the outer section of the part of the shoe.

The orientations of the infill connecting lines and/or the infill connecting structures are preferably determined based on the outer section and the inner section, wherein preferably a combination of a point on the outer section together with an associated point on the inner section defines the orientation of a corresponding infill connecting line. The orientation of an infill connecting line may be defined, e.g., by an angle θ in relation a normal (perpendicular) line, i.e., an imaginary line which is perpendicular to the outer section/outer surface.

With the method of the present invention, a desired softness or flexibility of the part of the shoe is preferably defined by such angle(s) θ, e.g. the angles between the infill connection lines and an axis perpendicular to the outer section (outer surface), wherein the angle θ is preferably chosen larger if the shoe part is desired to be softer.

Preferably, a shoe part has at least two areas with different softness. In other words, the shoe part comprises at least a first region and a second region directly adjacent to the first region along the direction of the outer region. It will be appreciated that a shoe may have a plurality of regions having different softness or stiffness. For the sake of simplicity, it is sufficient if only two regions are compared with each other, which can then also be applied to more than two regions. For instance, the angle(s) $\theta$ between the infill connection line(s) and an axis perpendicular to the outer section (outer surface) of the first region is/are larger than the angle(s) $\theta$ of the second region, such that first region is softer/more flexible than the second region.

It is preferred to use a flexible filament for printing, preferably a thermoplastic material. Further preferred materials are thermoplastic polyurethane (TPU), thermoplastic elastomers (TPE), polypropylene (PP), polyamide, e.g., nylon, flexible polyurethane, thermoplastic copolyester (TPC), and various bio-based polymers.

According to a further preferred aspect of the invention, the orientations of the infill connecting lines and/or connections structures are calculated on a layer-by-layer basis. In other words, the infill structure of each layer is preferably determined individually and distinguishes to some extent from a directly adjacent layer by a certain degree. In contrast thereto, in the prior art, e.g., using a honeycomb structure as infill as shown in FIG. 1, the infill structure is basically the same and regular. Thus, a novel approach of the present invention can be seen in the individual infill construction of the individual layers. Still in other words, two adjacent layers (n, n+1) which are in contact may have different connecting lines and/or connection structures. On the other hand, however, this does not mean that all directly adjacent layers have a very different infill construction. In other words, according to the present invention, the filling structure of the successive layers can repeat. For instance, A, B and C refer to three layers with three different infill structures. Stacking of these different layers may be according to any of the following examples: ABCABC . . . , ABABC . . . , AABBCC . . . , ACBACB . . . . For instance, the stacking order might be regular or irregular. According to a preferred embodiment of a regular stacking order, the order might be defined in accordance with the Levi-Civita-Smbol, e.g. EABc equal 1, 0 or −1. This will be further discussed in connection with FIGS. 7a to 7c.

It is further preferred that two contacting adjacent layers (n, n+1) have maximal 10% of the connecting lines in common such that 90% or more of the connecting lines differ in two adjacent layers. According to other embodiments and depending on the appearance of the outer surface, maximal 20%, maximal 30%, maximal 40%, maximal 50% or maximal 60% of the connecting lines have the same direction and location except their different layer.

In the improved design for 3D printing according to the present invention, a key feature is the distinct orientation of the infill connecting lines between adjacent contacting printing layers (n, n+1). Preferably, infill connecting lines of at least two subsequent layers, preferably a plurality of subsequent layers (n, n+1, n+2, . . . ) or even all subsequent layers are oriented at a predetermined angle relative to the infill connecting lines of the preceding layer. This angle ensures significant differentiation in the direction of connecting lines between adjacent layers.

In a regular infill construction according to the prior art, the connection lines of two adjacent layers, e.g. layer n and layer n+1, comprise the same or similar orientation. Accordingly, the connecting lines of the two adjacent layers basically fully overlap. On the other hand, according to the present invention, the infill pattern between directly adjacent layers may have low contact, when printing lines of different directions only overlap at their junction, i.e., at points. Therefore, the amount of overlap in a regular pattern between two adjacent layers (n, n+1) is at least 90% or more. On the other hand, the overlap of the irregular infill pattern of the present invention is preferably less than 50%, preferably less than 40%, less than 30%, less than 20% or even less than 10%. This overlap of adjacent printing layers (n, n+1) will become clear below in connection with the drawings (see, e.g., FIGS. 6 and 7). An overlap ratio between directly adjacent layers n, n+1 will be further discussed below as "inter-connection-ratio".

For instance, for an A-B-A-B stacking pattern, it is preferred that no more than 40%, 30%, 20% or even 10% of the connecting lines in two adjacent layers (n, n+1) have the same direction and location, ensuring that at least 60%, 70%, 80% or even 90% of the connecting lines in the layer n have no corresponding connecting line in layer n+1. This stipulation applies to the transition between different types of layers (A to B and B to A). In other embodiments, depending on the outer surface's appearance and structural requirements, the maximum percentage of connecting lines with the same direction and location in adjacent layers may be increased to 20%, 30%, 40%, 50%, or up to 60%.

Furthermore, when the layering process returns to an orientation that matches an earlier layer, such as after a full rotation of infill line orientations, a controlled overlap is allowed. In particular, the A-B-A-B pattern, this overlap, where connecting lines in layers with the same orientation may coincide, is limited to a range of 60-80%. This ensures that even when layers share the same orientation, their structure remains similar, maintaining both the uniqueness and the structural integrity of the infill pattern.

In the exemplary case of the A-A-B-B-A-A-B-B stacking pattern, the concept is extended to allow for overlapping infill structures in adjacent layers. Here, two consecutive layers of the same type (A-A or B-B) have an overlap in their infill structures. In other words, layers n and n+1 have a substantial overlap in their infill structure. The overlap percentage for these consecutive layers can be similar to the previously mentioned range of 60-80%. This approach offers enhanced structural support where needed, while still maintaining the overall integrity and variability of the infill pattern throughout the shoe. On the other hand, the overlap between layer n+1 and n+2 is again small.

The individual layer-by-layer construction of the infill pattern is preferably based on the construction of points on the outer contour of the shoe model and points on the inner contour of the shoe model. The present invention provides several methods for constructing these points on the outer contour of the shoe model, hereinafter also referred to as outer points, and points on the inner contour of the shoe model, hereinafter also referred to as inner points. First, a preferred projection method will be explained in more detail.

Outer Points—Projection Method

First, for the determination of the orientations of the infill connecting lines, a first point cloud is generated on an outer contour line or outer contour surface if considered to cover multiple layers. This outer contour line (for one layer) or contour surface (for multiple layers) is preferably located outside and preferably spaced apart from the outer section of the shoe. Preferably the outer contour line and/or contour surface at least partly surrounds the part art of the shoe.

It is preferred that from a point of the first point cloud a corresponding outer point on the outer section of the shoe part is mapped. In other words, a point from the first point cloud has a corresponding point on the outer section of the shoe part. For instance, the number of points in the first point cloud and the number of points on the outer section are identical, such that for each point from the first point cloud a corresponding point on the outer section of the shoe part is determined. According to other embodiments, the number of first point cloud points and the number of points on the outer section of the shoe part may differ, e.g. only a subset of the points of the first point cloud may be used for the construction of corresponding points on the outer section.

This construction provides, for example, also the effect that the infill pattern of two shoes of different size is similar. Here, the term similar is meant to be the term used in geometry. In particular, in Euclidean geometry, two objects are similar if they have the same shape, or if one has the same shape as the mirror image of the other. More precisely, one can be obtained from the other by uniformly scaling (enlarging or reducing), possibly with additional translation, rotation and reflection. This means that either object can be rescaled, repositioned, and reflected, so as to coincide precisely with the other object. If two objects are similar, each is congruent to the result of a particular uniform scaling of the other. In prior art printing, it is preferred that the size of the infill pattern is constant such that by changing the size of the printed object, the size of individual infill cells is the same, but the number of the infill cells is increased.

The points of the outer point cloud are preferably on a circular line, e.g., a part of a circular line, an entire circle, a half circle etc. or on a line similar to a circle, e.g., a partly elliptical line. As mentioned above, the outer point cloud is preferably located on a "line" in view of a single printing layer. For a plurality of adjacent layers, it is preferred that a corresponding area for the point cloud is constructed, e.g., an area which is created by moving the line along the Z-axis. In a preferred embodiment, a line which is part of a cylinder for a single layer would then be a cylindrical area along the Z-axis for covering multiple printing layers.

Outer Points by Placing Points Directly on the Model

In addition to the previously described method of generating a first point cloud on an outer contour line or surface for the construction of outer points, there is an alternative approach that involves directly creating points on the model of the shoe part itself. This method entails placing points directly onto the actual 3D model of the shoe part, particularly on its outer section.

In this approach, the outer points are not determined indirectly through a point cloud generated on a separate contour line or surface. Instead, they are directly mapped onto the outer surface of the shoe part model. This direct placement allows for a more precise and immediate representation of the outer points in relation to the actual geometry of the shoe part.

The number of points placed can vary depending on the design requirements and the complexity of the shoe part's surface. This becomes clearer with reference to FIGS. 7a to 7c, in which three successive layers are shown. This direct placement method can be particularly advantageous when dealing with complex shapes or when a high degree of accuracy is desired in the mapping of the outer points to the shoe part's surface.

Equidistant Placement of Outer Points

Moving forward with the development of the infill pattern, an innovative approach can be adopted for the placement of outer points on the surface of the shoe part. This approach involves placing these points equidistantly on the surface, ensuring a uniform distribution across the entire area.

The equidistant placement of points is advantageous for achieving a consistent and balanced infill pattern. By distributing these points at equal distances from each other, the resulting infill structure will exhibit uniformity in terms of strength, flexibility, and aesthetic appeal. This method is particularly effective in maintaining the integrity of the design regardless of the shoe size or shape. Preferably, at least 70% or even more of the outer points are placed equidistantly.

To implement this, a systematic grid or pattern may be applied to the surface of the shoe part, where points are placed at regular intervals. This grid ensures that each point is equidistant from its neighboring points, creating a harmonious and evenly spaced infill pattern. This technique is beneficial for producing a scalable infill design that can be easily adapted to different sizes and shapes of shoe parts while maintaining the desired properties and appearance of the infill pattern.

Inner Points

Once the points on the outside of the shoe part are constructed, it is preferable to construct corresponding inner points, i.e., points located on the inside of the shoe part. It is preferred to construct one inner point for each outer point. According to further embodiments, the number of outer points may be larger or smaller. For instance, for some of the outer points, but not every outer point, inner points are constructed. On the other hand, it is also possible that an outer point is used for the construction of more than one inner point.

For the construction of inner points on the inner side of the shoe part, different construction methods may be used.

The first type may be called "reference point projection". This method involves projecting onto a reference point. For instance, in case the first point cloud is provided on a circle, this reference point can be the circle's center, i.e., the reference point is one single point, also called the second point of a second point cloud. For this method, it is preferred to define at least one inner cloud point (or reference point), e.g. at least one point which is spaced apart from the inner section of the shoe part opposite to the outer section. In other words, this inner cloud point is inside the shoe part as shown, e.g., in the figures.

A second type may be called "closest point projection". This second method involves projecting from the shape to the nearest point on the model. In particular, the nearest point is the point with the smallest distance between the two points. Here it should be noted that the model in question could be either the shoe model or the last model (the model of the foot).

Both methods have their unique applications and outcomes, and the choice between them depends on the specific requirements of the projection task. Needless to say that both methods can be used in printing a shoe part and preferably for each layer it is possible to construct the outer and inner points by different projections models. It is also possible to construct a first set of inner points by a first projection model and a second set of inner points in the same layer by a second projection model. Again, needless to say that a plurality of projection models may be used for each layer and/or for different layers.

The printing method of the present invention provides an advantage that breathable and mesh-like structures can be created. For instance, to create a textile-like haptics, the method of the present invention utilizes ways of alternating layer types, directions and heights.

It is preferable to provide a stacking of layers of different directions, heights and types to create a composite structure that balances aesthetics with functionality. For example, by following specific tangential angles dictated by the shoe design (rather than simple infill projection), a uniformly soft mesh pattern can be created.

In addition, the thread-like nature of FDM (Fused Deposition Modeling) printing is preferred, so that individual fine threads can be exposed, creating not only a textile-like aesthetic, but also a feel very similar to traditional knit fabrics.

BRIEF DESCRIPTION OF THE FIGURES

Preferred embodiments of the present invention are further elucidated below with reference to the figures. The described embodiments do not limit the present invention.

FIG. 2a shows cross-section of a printed shoe similar to FIG. 1 with different model structures;

FIG. 2b shows the same cross section as FIG. 2a but with a single model input;

FIG. 3 shows a substantially rectangular cross-section of a printed layer with a regular infill structure according to the prior art;

FIG. 4 shows a section of a shoe with two adjacent layers of a 3D print with clearly different alignment of individual print lines (solid black and black contour lines);

FIG. 5a illustrates a projection method for the construction of outer points according to the present invention;

FIG. 5b illustrates a projection method for the construction of an inner point according to the present invention;

DETAILED DESCRIPTION OF THE INVENTION

Figure 1:
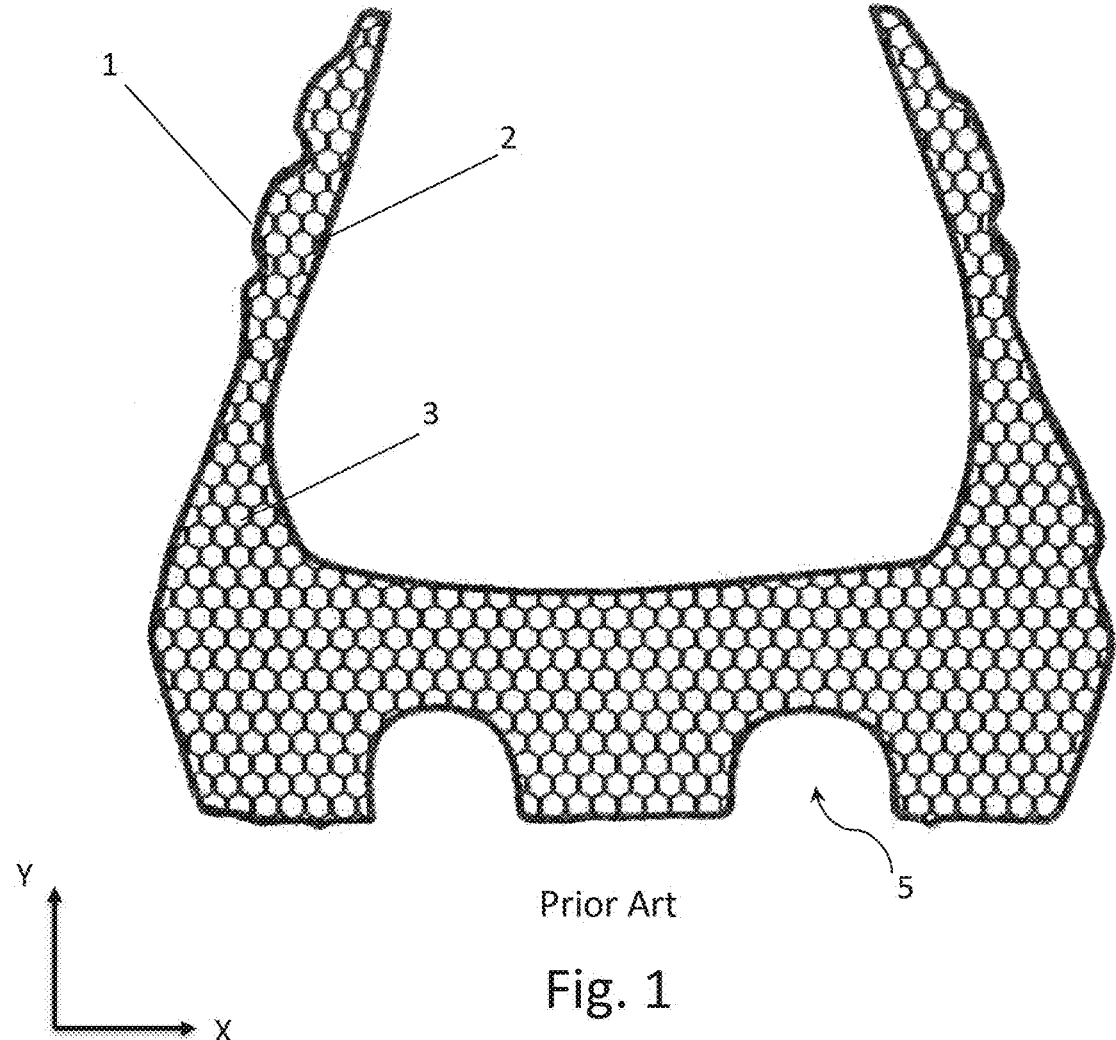
FIG. 1 shows a cross-section in the area of the entrance through a 3D printed shoe according to the prior art.

For a better understanding of the new method of 3D printing according to the present invention over the art, the prior method as exemplary illustrated in FIG. 1 will be discussed. FIG. 1 shows a cross-section of a printed shoe according to the prior art.

The cross-section of FIG. 1 represents a single printing layer within the XY-printing plane. The shoe comprises a sole 5 and a shoe upper with the outer section 1 of the shoe upper and the inner section 2 of the shoe upper. As illustrated in FIG. 1, a continuous outer and inner contour is provided by a continuous shell, wherein between the outer shell and the inner shell the infill structure is provided, here in the shape of a regular honeycomb structure 3. According to the prior art, each cell of the honeycomb structure is oriented in the same direction. Moreover, also the next printing layer (not shown) which is printed on top of the illustrated layer comprises exactly the same honeycomb structure with exactly the same orientation.

FIGS. 2a and 2b show two cross-sections of a shoe with the sole 5 pointing to the right. FIG. 2b shows a single model input, i.e. the entire cross section of the shoe is represented as a single continuous layer, with the upper of the shoe having a surface layer opposite the sole 5. FIG. 2a shows the same cross section, but in the form of a split model. In particular, the sole of the shoe comprises an outer closed shell with a midsole inside this shell of the sole. Moreover, also the sides of the shoe (illustrated on the upper and lower side of the cross section) show a closed shell construction with an infill. On the left side of FIG. 2a, the shoe upper is illustrated with a mesh structure, where the mesh structure is printed with the method of the present invention.

FIG. 3 shows an example of a regular prior art infill construction with a triangular infill pattern. As a mere example, a printing layer of rectangular outer shell is shown with a triangular infill pattern, wherein exemplary infill lines L1 and L2 are indicated. For instance, infill line L1 from one part S1 of the outer shell is printed approx. in an angle of 15° with regard to a Y axis.

If the entire form is rotated, as shown on the right side of FIG. 3, the outer shell is rotated but the infill structure is the same as shown in the left side of FIG. 3. Again, line L2 is oriented with an angle of 15° relative to the Y axis.

Figures 6A, 6B:
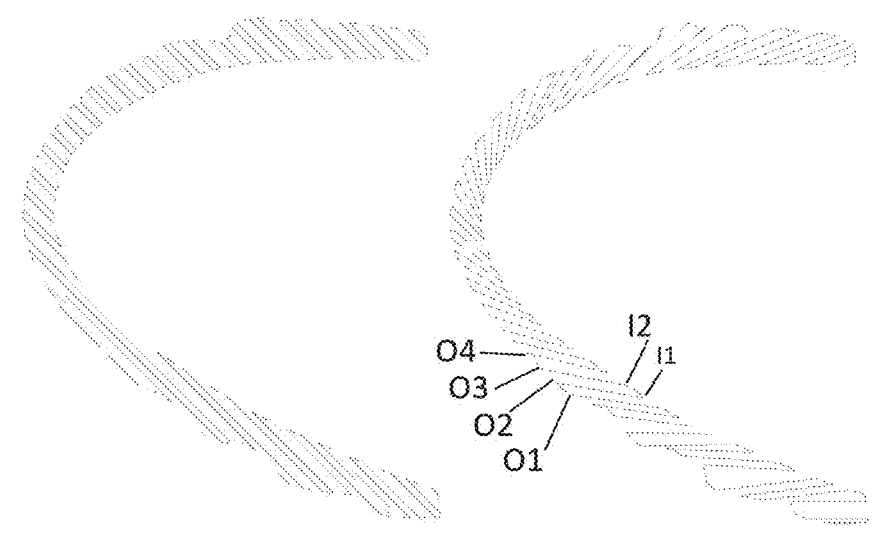
FIG. 6a shows a cross section with an infill of a prior art shoe.
FIG. 6b shows a cross section with an infill according to the present invention.

FIG. 6b shows a printing layer according to the present invention. The Illustrated part is a shoe upper similar to the shoe upper as illustrated in FIG. 2a. In this printing layer, there is no continuous outer shell printed but only parts of an outer shell with gaps in-between. By providing such gaps in the "outer shell" a mesh-like appearance of the shoe upper is possible. For the construction of the outer printing points O1, O2, O3, O4, on the virtual model of the shoe model, different techniques may be used. These outer points O1, O2, O3 and O4 then define the orientation of the infill connection lines. The orientation of the infill connecting lines, as illustrated for example with outer points O1 to O4 and inner points I1, I2. In a first step outer points O1-O4 are constructed. Then, inner points I1, I2 are constructed. The construction method will be discussed in further detail below. Moreover, according to the present invention it is also possible that the inner points are first constructed and then the outer points. In a next step the connection lines for the infill structure are constructed. Here, the infill is shown as a meander pattern. There is a connection line O1 to O2 along the outer contour of the shoe model. Next, O2 is connected to I1. I1 is connected to I2 along the inner contour line of the shoe model. I2 is connected to O3 and O3 is connected to O4. In other words, based on the constructed points on the outer contour of the shoe model, the infill connection lines are constructed, which can lead to very different orientations of the connection lines, which is very different from a regular infill pattern of the prior art.

The method of the present invention provides a plurality of advantages in footwear manufacturing by utilizing 3D printing technology, particularly in the manufacture of shoe uppers, overcoming the limitations of conventional mesh or shell techniques.

With the approach of the present invention, material flexibility can be improved, the printing process can be accelerated, and the incorporation of harder materials is also possible. The method is preferably tailored for foaming materials, can preferably significantly improve the design and production efficiency of shoe uppers.

In the prior art, the last of the model is used as a reference to generate consistent infill, regardless of the position or orientation of the shoe on the print bed. For instance, FIG. 3 illustrates the effect of prior art infill calculation in case a basically rectangular structure is rotated with regard to a Z-axis.

In the following, a Cartesian coordinate system is used such that any point in space can be located and described using three coordinates respectively lying along the X-, Y-, and Z-axes, each of which is perpendicular to the other two. While one single axis can successfully indicate a position along a line, with three axes, one can situate any point in three-dimensional space. Typically, lateral movement (i.e. left, right, front, back) is usually assigned to the X- and Y-axes, while the Z-axis corresponds to vertical motion. By this convention, each layer is deposited within the XY-plane, while Z movement is responsible for advancement between layers using a pre-defined height set in a 3D slicer.

The diagonal infill line L1 in the left object of FIG. 3 is parallel to the diagonal line L2 of the right object. In other words, the orientation of the connection lines of the regular infill is predetermined by the orientation of the XY-plane of the printing bed of the printer and the outer walls of the object are calculated around the predetermined regular infill structure.

With the method of the present invention, the positioning and rotation of the shoe model do not affect the infill structure, allowing for greater flexibility and streamlining of the printing process. The uniformity of the shoe structure is maintained regardless of its placement on the print bed, improving the consistency of the final product. In particular, gcode (G-code; also RS-274) generation is preferably based on the last of the model, which standardizes the infill pattern regardless of the placement or orientation of the model during printing.

In contrast to most other manufacturing techniques, 3D printing allows to carefully control two mutually exclusive aspects of a part: the outer walls (or perimeters) and the infill. The walls, no matter how thick, are the outermost regions of the part, while the infill is what is inside them. In short, infill refers to structure inside a 3D printed model. The infill plays a huge role in a part's strength, weight, structure, buoyancy, and more. In 3D printing, there is the ability to define a number of parameters that control the type of infill used for a part. These parameters are set in a slicer program when a 3D model is translated into G-code instructions. The most important of these parameters fall under two fundamental aspects: infill density and infill pattern. The present Invention is directed to a new method for calculating, providing and printing an infill pattern.

Infill pattern is the structure and shape of the material inside of a part. Ranging from simple lines to more complex geometric shapes, infill patterns can affect a part's strength, weight, print time, and even flexibility. The present invention provides a new approach for infill pattern which may be briefly characterized, in contrast to prior art infills, as irregular.

According to the present invention, outer points on the outside of the shoe part are constructed. Next, inner points on the inner shoe part are constructed. These outer and inner points define the infill structure. For instance, certain outer points are connected with certain inner points by a straight line. According to a further embodiment, outer points and inner points may be connected by curved lines, i.e., lines which are curved within the printing plane/printing layer. Moreover, outer points may be connected with other outer points and some inner points are connected with other inner points (see, e.g. FIG. 6b).

Thus, the outer points and the inner points may be considered junction points which are junctions for the infill connecting lines or the infill connecting pattern. The outer points are further used to define the outer section of the shoe part. As mentioned above, it is preferred that the outer appearance of a shoe provides a mesh-like structure. Hence, it is preferred that there is no continuous outer wall, but rather an outer structure which comprises some "cutouts", gaps or apertures. Still in other words, by connecting certain outer points with other outer points and providing between certain outer points no connection along the "outer surface", an aperture in a printing layer can be formed. The same is true for inner points.

There are several methods for constructing the outer point(s) on the shoe part in accordance with the present invention. A first projection method is discussed in conjunction with FIGS. 5a and 5b. In this exemplary method, an outer shape is used to extend points outward from the shoe. In FIG. 5a, a circular outer shape 200 (also called outer contour line, outer contour surface, outer template) is provided outside the shoe. This outer shape may have any shape and is not limited to the Illustrated circular shape 200. Preferably, several points on the outer shape 200 are constructed, wherein the plurality of these points form a first point cloud 201. These points of the first point cloud 201 are projected on the shoe model 250 to define the outer points 251 of the shoe part or shoe model 250. As illustrated in FIG. 5a, projection from each point of the outer point cloud 201 by means of a single central inner point 253 is used for ease of illustration. It should be noted that more than one inner point 253 may be provided to the projection. Accordingly, instead of a single point 253, a second or inner point cloud 253 may be used for the projection construction.

As mentioned above, in addition to the projection method, a method of creating points directly on the model of the shoe part itself is possible. This method involves placing points directly on the actual 3D model of the shoe part, especially on its outer part.

As illustrated in FIG. 5b, inner points, i.e., points on the inner side of the shoe part or shoe model 250 may be constructed in a similar way. For instance, a projection from the outer point cloud 201 or a different outer point cloud to the inner point 253 may be used, wherein the intersection of the projection line from the point of the outer point cloud 251 and the inner point with the inner side of the shoe model 250 determines the inner point 252.

According to the present invention there are several other ways how the inner points 252 are constructed, i.e., the points 252 on the inner section/inner surface of the shoe part, Four different exemplary techniques for creating corresponding interior points 252 are discussed below.

1.) Rotate the outer shape by an angle β (e.g. ranging between 5 to 10 degrees, but can vary from 2 to 45 degrees; see FIG. 4). This rotation generates a second point 252 inside the shape. As an example, the angle between two projection lines in FIG. 5b is 7.5 degrees.

2.) For a point created on the outer edge (point 251), the corresponding inner point is determined by extending a line at an angle α from the tangent at point 251, as illustrated in FIG. 4. Essentially, the infill line is drawn in relation to the tangential line at the projected point.

3.) After generating the first point 251, a line 211 at angle γ relative to the projection line is constructed from said first point 251 (see FIG. 8a). The intersection between the line 211 and the inner surface of the model creates the inner point 252.

4.) For each generated point 251, the nearest point 2520 on the shoe's inner side is identified. The shortest distance between point 251 and nearest point 2520 is indicated with distance x. Knowing the distance x, a corresponding predetermined value y along the inner side of the shoe end point 252 is determined. In other words, this value y dictates the angle θ and the angle determines the value y. In FIG. 8b, θ is a fixed angle, and y is calculated as y=x tan(θ).

Figure 8A:
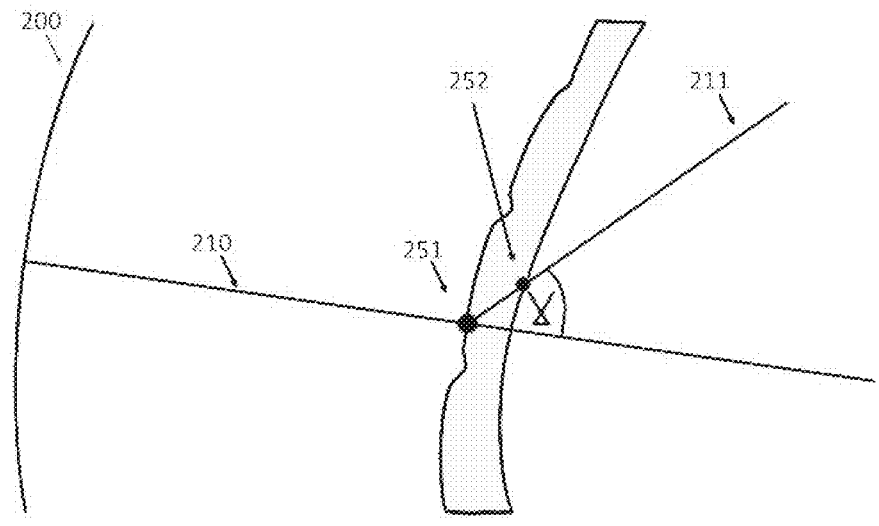
FIG. 8a illustrates a projection method for the construction of an inner point.
Figure 8B:
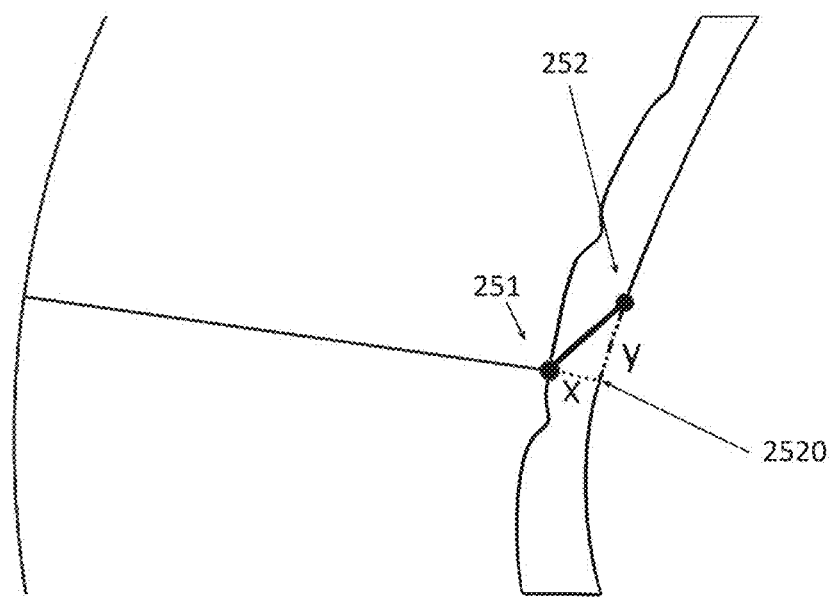
FIG. 8b illustrates a construction method of an inner point based on a distance definition.

FIGS. 8a and 8b illustrate the construction of an outer point 251 and a corresponding inner point 252. For the infill, said two points may be connected by a straight line. The geometry of the connections between the outer points 251 and the inner points 252, however, can vary, including options such as straight lines, curved lines, or complex patterns like gyroid lines. In the following, the above briefly outlined procedures for constructing the inner points are explained in more detail.

1. Rotation: In this method, the continuous outer layer (outer contour line 200) is rotated by an angle β, around the center point or any other defined point, which can range from 2 to 45 degrees, typically between 5 to 10 degrees. This rotation is applied to the first point cloud 201 on the outer section 200. After the rotation, another point is projected to generate the inner point 252 inside the shape, on the inner section 12 of the shoe part. This technique allows for the creation of an inner point 252 that is geometrically related to the corresponding outer point 251.

2. Extension of Tangent Line from the Outer Point: For a point created on the outer edge (outer point 251), the corresponding inner point 252 is determined by extending a line at an angle α from the tangent at point 251. This method involves drawing an infill connection line (14 or 16) in relation to the tangential line at the projected outer point 251. The angle α and the tangent line's direction determine the position of the inner point 252 on the inner section 12.

3. Line Construction from the Outer Point: After generating the outer point 251, a line 211 at an angle γ relative to the projection line is constructed from said point. The intersection of this line 211 with the inner surface 12 of the shoe model 100 creates the inner point 252. This technique effectively uses the geometric relationship between the outer point 251, the angle γ, and the shoe's inner surface to determine the position of the inner point.

4. Identification of Nearest Point on Inner Side: For each generated outer point 251, the nearest point 2520 on the shoe's inner side 12 is identified. The shortest distance between point 251 and the nearest point 2520 is indicated with distance x. Knowing the distance x, a corresponding predetermined value y along the inner side of the shoe end point 252 is determined. The value y dictates the angle θ, and the angle determines the value y. This method relies on finding the closest point on the inner surface relative to each outer point and then using geometric principles to determine the precise position of the inner point 252.

These techniques provide different ways of establishing a relationship between the outer points 251 and the corresponding inner points 252 in the shoe model 100, forming the basis for creating a structured and consistent infill structure 30 within the shoe part.

Infill pattern, the internal structure of a part, plays a crucial role in determining a part's strength, weight, print time, and flexibility. Unlike traditional, regular infill patterns, the present invention also introduces an innovative approach that starts from the inside of the part and works outward, creating an irregular infill pattern. This method, particularly applied to shoe parts, reverses the conventional process by first constructing inner points on the shoe's inner section, then determining corresponding outer points to define the infill structure. This inside-out strategy offers a unique way to tailor the shoe part's properties, such as flexibility and strength, to specific requirements.

Constructing Inner and Corresponding Outer Points

1. Initial Inner Point Creation: Inner points are preferably first established on the inner section of the shoe model 100. These points serve as the starting points for the infill structure and are used in defining the internal framework of the shoe part.

2. Determining Outer Points from Inner Points:

Extension of Lines from Inner Points: For an inner point 252 (preferably for each inner points 252), a line is extended outward at a specific angle α. The line's direction and length are chosen based on desired characteristics like the flexibility or strength of the shoe part. The point where this line intersects the outer boundary of the shoe model 100 preferably defines the corresponding outer point 251.

Rotational Method: An inner point 252 (preferably each inner point 252) is used as a pivot to rotate a line or vector by an angle β, typically ranging from 2 to 45 degrees. The end of the rotated line or vector on the shoe's outer surface becomes the outer point 251. This method allows for a controlled yet irregular placement of outer points, contributing to the uniqueness of the infill pattern.

3. Nearest Outer Point Identification:

Distance-Based Outer Point Selection: For an (preferably each) inner point 252, the nearest potential outer point on the shoe's outer surface is identified. This method involves calculating the shortest distance from each inner point to the outer surface, thereby determining the most structurally efficient location for the outer point 251.

Angle and Distance Optimization: The angle θ between the inner point and the outer surface, along with the distance, is selected to ensure structural integrity and desired physical properties. This optimization process allows for a custom-tailored infill structure that adapts to different parts of the shoe, providing varying degrees of flexibility and support where needed.

These methods collectively offer a versatile and innovative approach to designing the infill structure of a shoe part, starting from the inside and working outward. By focusing on the internal points first, this approach allows for a more tailored and efficient infill pattern that directly responds to the functional and aesthetic requirements of the shoe design.

Reversible Approach for Infill Pattern Creation

In contrast to already presented methods, this invention also presents a reversible approach for infill pattern creation, particularly for shoe parts. Instead of starting with outer points and then defining inner points, this method begins by establishing points on the inner section of the shoe part. These initial inner points then serve as the basis for determining corresponding outer points, effectively reversing the process. This inside-out strategy offers a unique and tailored approach to the design of the shoe part's infill structure, providing an enhanced ability to customize the part's properties such as flexibility, strength, and overall functionality.

Constructing Inner and Corresponding Outer Points

1. Initial Inner Point Creation: Inner points are first established on the inner section of the shoe model 100. These points serve as the starting points for the infill structure and are crucial in defining the internal framework of the shoe part.

2. Determining Outer Points from Inner Points:

Extension of Lines from Inner Points: For each inner point 252, a line is extended outward at a specific angle α. The line's direction and length are chosen based on desired characteristics like the flexibility or strength of the shoe part.

The point where this line intersects the outer boundary of the shoe model defines the corresponding outer point 251.

3. Nearest Outer Point Identification:

Distance-Based Outer Point Selection: For each inner point 252, the nearest potential outer point on the shoe's outer surface is identified. This method involves calculating the shortest distance from each inner point to the outer surface, thereby determining the most structurally efficient location for the outer point 251.

Angle and Distance Optimization: The angle θ between the inner point and the inner surface, along with the distance, is selected to ensure structural integrity and desired physical properties. This optimization process allows for a custom-tailored infill structure that adapts to different parts of the shoe, providing varying degrees of flexibility and support where needed.

This reversible approach to infill pattern creation offers a novel way to design shoe parts, enabling more precise control over the internal structure and resulting in a product that better meets specific functional and aesthetic requirements.

Infill percentage, for its part, controls the density of the structure and is represented by a percentage value. For example, a 3D print with 100% infill will have a solid internal structure, while a 3D model with 0% infill will be printed as an empty shell. In other words, a higher infill percentage will increase the amount of material inside the 3D printed component. The infill percentage directly influences the infill density, but it also has an impact on many other properties, including the final 3D part's strength, flexibility, and weight, as well as overall 3D print time. In general, a higher infill percentage will increase part strength, weight, and 3D printing time. Choosing the right infill percentage for a particular 3D print job is therefore important in meeting design and performance goals.

The materials suitable for 3D printing processes according to the present invention are preferred but not limited to, thermoplastic polyurethane (TPU), thermoplastic elastomers (TPE), polypropylene (PP), nylon, flexible polyurethane, thermoplastic copolyester (TPC), and various bio-based polymers. Each of these materials has been meticulously chosen for their distinct properties. For instance, TPU is known for its exceptional flexibility and durability, making it ideal for creating comfortable, long-lasting footwear. TPE offers similar benefits to TPU, providing both flexibility and a soft feel, which is crucial for comfort in footwear. PP is valued for its lightweight nature and resistance to wear, offering a balance between comfort and durability. Nylon brings high strength and flexibility to the table, along with excellent abrasion resistance, making it suitable for high-wear areas of shoes. Flexible Polyurethane is renowned for its cushioning properties, making it ideal for insoles and midsoles where comfort is paramount, TPC combines rubber-like elasticity with the ease of plastic processing, offering a unique balance of flexibility and high-temperature resistance. Bio-based Polymers are included as a sustainable option, aligning with environmental considerations while still providing the necessary performance characteristics for footwear. Each material is selected based on its ability to meet the specific demands of footwear manufacturing, including flexibility, durability, comfort, and environmental sustainability.

For example, for materials with greater stiffness, such as stiffer thermoplastic polyurethane (TPU) or polypropylene (PP), employing curved lines as the connection geometry may be advantageous. This approach not only leverages the inherent flexibility of the material but also introduces additional flexibility within the structure itself. This dual-flexibility system enhances the overall performance and adaptability of the material to various applications.

Layer Stacking

As mentioned above, the present invention might be characterized by the individual layer construction. In other words, the infill structure of each layer is individually constructed and may differ from directly contacting adjacent layers. Therefore, it is possible to stack differently constructed layers which result in a specific outer appearance of the shoe part.

Additionally, it is also possible to vary the height, i.e., the material thickness in the direction of the Z-axis.

Irregular Vs. Regular (Different Directions of Connection Lines within a Layer)

FIGS. 6a and 6b illustrate different infill pattern. In contrast to FIG. 3, the fill pattern in FIG. 6a provides some gaps along the outer contour which is achieved by the meander like pattern. In contrast to the other embodiment of FIG. 6b, the meander pattern provides regular connecting lines throughout the layer. In other words, all connecting lines between outer points and inner points are substantially oriented in the same direction and are therefore substantially parallel. This infill pattern is therefore not determined based on the outer contour and the inner contour of the shoe model.

In contrast, the printed layer shown in FIG. 6b has an irregular pattern of connecting lines between outer and inner points. Because the connecting lines of the infill are irregular within a printing layer, this irregularity can be referred to as "inlayer irregularity. The irregular pattern might be characterized in that adjacent connecting lines are not parallel. The inlayer irregularity may also be characterized in that at least 20%, preferably more than 30%, 40%, 50%, 60%, 70% or even more than 80% of the connecting lines are differently oriented compared to each other. For instance, if all connecting lines in a layer are parallel, less than 1% of connecting lines are differently oriented compared to each other. In other words, if all connecting lines are parallel, the connecting lines in the layer are equally oriented to 100% compared to each other. This would mean that according to the present invention less than 20%, 30%, 40%, 50%, 60%, 70% or 80% are equally aligned to each other. Here, it is important that the comparison applies for each printed layer separately and individually, since according to the present invention different printing layers (n, n+1) are subsequently printed to achieve the special outer appearance and/or the individual mechanical properties of the printed product. Such a difference in the orientation of the connecting lines can be called an inlayer irregularity.

Interlayer Different Pattern (Different Directions of Connection Lines in Different Layers)

Figures 7A, 7B, 7C:
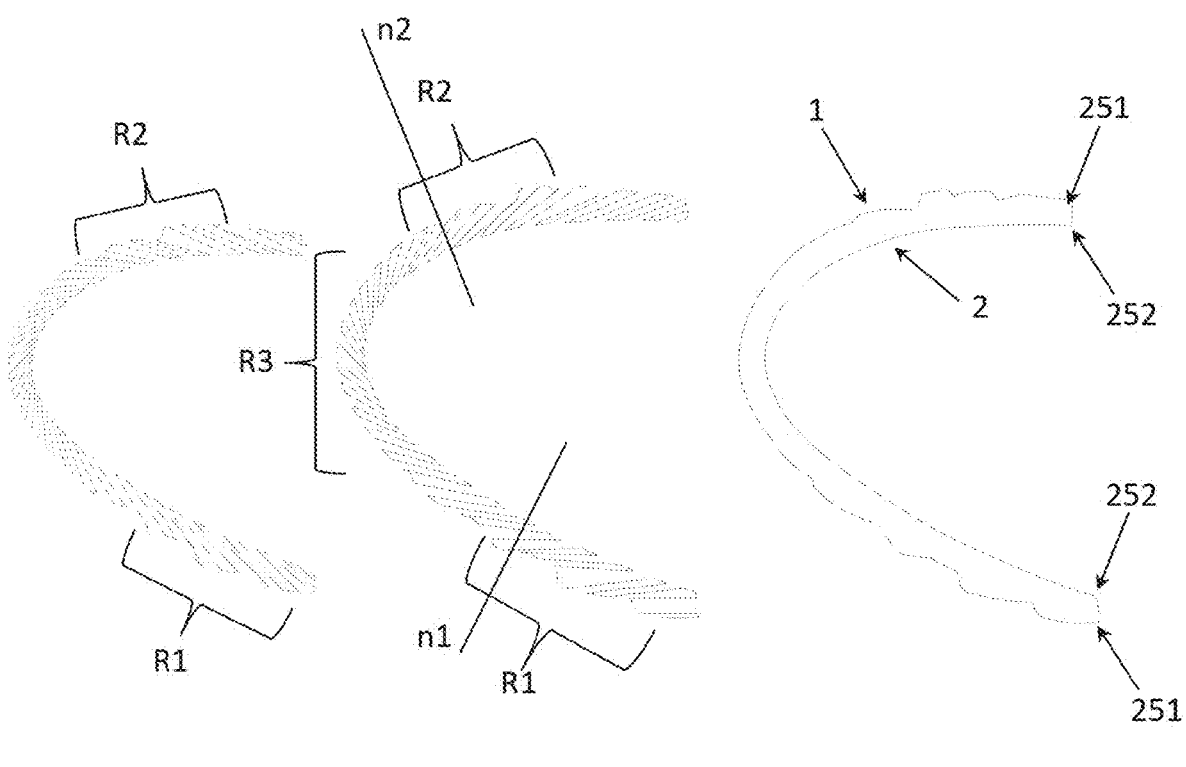
FIGS. 7a, b and c show three different cross sections of a shoe part printed in accordance with the present invention.

The present invention also relates to a kind of irregularity between directly adjacent layers (n, n+1) which provides an advantage, for example, that certain softness properties of the shoe upper can be provided with a texture-like outer appearance. Such inter-layer irregularity becomes clearer in conjunction with FIGS. 7a to 7c, which further illustrate that adjacent layers may have different irregular patterns. For example, the layers of FIG. 7a could be referred to as pattern "A" or "layer A", while FIG. 7b illustrates pattern "B" or "layer B". FIG. 7c illustrates pattern "C" or "layer C". These layers can be stacked in the order ABCABC, etc.

Certain layers might be briefly characterized as "open layers" and "closed loop layers". For instance, FIGS. 7a, 7b and 7c show three subsequently printed layers, e.g., layer n, layer n+1 and layer n+2, which are directly adjacent, i.e., the layer shown in FIG. 7b is sandwiched between the layers shown in FIGS. 7a and 7c.

The layers of FIGS. 7a and 7b show a discontinuous outer shell and a discontinuous inner shell, i.e. there are gaps on the outer contour of the shoe model and also on the inner contour of the shoe model. In other words, the layers in FIGS. 7a and 7b are similar to the example in FIG. 6b. It should also be noted that the outer points in FIG. 7a are different from the inner points of the layer in FIG. 7b, and the connecting lines are also very different, so that most of the connecting lines between adjacent layers are different. These layers can be called "open layers".

First, each layer of FIGS. 7a and 7b show an inlayer irregularity. In other words, the orientation of the connection lines within a single layer, e.g., as shown in FIG. 7a are already very different from each other and irregular within a layer. The same is true for the connecting lines in the layer of FIG. 7b, i.e., also in this layer, the connecting lines are different within a single layer.

Moreover, comparing the connecting lines from FIGS. 7a and 7b, it can be seen that also the interlayer orientation, i.e., orientation by comparing two different layers, is very different. Hence, the resulting infill orientations of the present invention might be characterized as double irregular, namely inlayer irregular and inter-layer irregular.

The inlayer irregularity might be further quantified by comprising less than 20% connection lines which are oriented in the same direction, less than 30%, less than 40%, less than 50%, less than 60%, less than 80%.

The inter-layer irregularity might be similarly quantified, e.g., by comprising less than 20% connection lines which are oriented in the same direction, less than 30%, less than 40%, less than 50%, less than 60%, less than 80%, when comparing directions of two adjacent layers (n, n+1).

The inter-layer irregularity might be also quantified by the volume of overlap of connections. In particular, since the connection lines of FIGS. 7a and 7b are oriented very differently, there are mainly interconnection points (see also FIG. 4). Hence the inter-connection-ratio of two connection areas between two adjacent layers is preferably less than 80%, less than 70%, less than 60%, less than 50%, less than 40%, less than 30%, less than 20%.

In contrast, the inter-connection-ratio in a regular pattern, e.g., between two layers of the honeycomb structure of FIG. 1 is approx. 100%.

The inter-connection-ratio might be defined for the entire layer, by comparing all connection lines of layer n with adjacent layer n+1. As discussed in connection with FIG. 4, the angles of connection lines between outer and inner points with regard to a normal can define the softness or hardness of the shoe upper. In particular, FIG. 4 shows two directly adjacent layers n, n+1, where the printed lines of layer n are represented as solid black lines and the printed lines of layer n+1 are represented as black contour lines. In this context, it should be noted that the contour lines of layer n+1 are preferably also solid, and that the contour representation is for illustrative purposes only. The section of the printed shoe upper comprises an outer section 11 and an inner section 12. On the outer section 11, one exemplary outer point 15 is shown which is connected with a corresponding inner point via infill connection line 14. On the shown layer n+1 also one outer point 16 is illustrated which is connected with a respective inner point at 12.

In general the infill connecting lines in layer n which connect an inner point with an outer point are slanted to the right. On the other hand, the infill connection lines in layer n+1 are slanted to the left. The angle between connecting lines of layer n and layer n+1 is shown as angle β.

Moreover, the angle between a tangent line on the outer contour and a connecting line in layer n+1 is shown as angle α.

In FIG. 7b, two regions R1 and R2 are indicated. The connecting lines in R2 are approx. 40°±15° with regard to normal n2 which is perpendicular to the outer surface of the shoe model. These connecting lines between outer and inner points define the softness or hardness of the shoe upper in R2. The same is true for region R1 with regard to normal n1 in FIG. 7b.

To obtain a similar hardness in the same regions R1 in directly adjacent layer (see e.g. FIGS. 7a, 7b), it is preferred that the amount of angles of connecting lines with regard to n1 are similar, wherein n1 is the normal in said region, i.e., perpendicular with respect to the outer contour. As derivable from FIGS. 7a and 7b, however, the connecting lines in R1 are slanted in the opposite direction regarding normal n1. In particular, the connecting lines in R1 of FIG. 7a are approx. −40°±15° with regard to normal n1 which is perpendicular to the outer surface of the shoe model. In FIG. 7b, the amount of the angles of the connecting lines is the same, but with a different sign, i.e., 40°±15°.

From FIGS. 7a and 7b, it can be further deduced that the amount of angle of the connecting lines in regions R1 and R2 are similar. For example, it is desirable to have the same appearance and the same mechanical properties of the shoe upper on the left and right sides with respect to a wearer's foot. In addition, the sign of the angles with respect to the normal is preferably substantially the same in R1 and R2 within a single layer. The same is true for the layer shown in FIG. 7b.

This might be specified more generally as follows. According to an embodiment of the present invention, there exists preferably a region R1 in a layer n, in which connecting lines between outer points and inner points are different, but the average angles within this region R1 40°±15°, or 50°±15°, regarding normal n1, there is preferably in the directly adjacent layer (n+1) the same region R1, but with an average angle −40°±15° or −50°±15°.

The layer of FIG. 7c represents a "closed loop layer" by providing an outer continuously printed line which is connected to an inner continuously printed line in the form of a closed loop. In particular, outer points 251 and inner points 252 are constructed on the shoe model. Outer points 251 are connected along the outer contour of the shoe model such that a continuous outer shell 1 is formed. Similarly, the two inner points 252 are connected by an inner line along the inner contour of the shoe model to form an inner shell. The two outer and inner points are connected to each other wherein there are no additional connection lines between the outer shell 1 and the inner shell 2.

The open structure layers, as exemplified in FIGS. 7a and 7b, feature a design that differs significantly from the closed loop layers, as exemplified in FIG. 7c. Unlike the continuous, looped pattern of the closed loop layer, the open structure layers are characterized by their non-continuous, segmented design. This design incorporates a series of individual lines or segments that do not form a closed loop, but rather are arranged in a specific pattern to achieve desired properties.

The form of the open layers might be characterized as meander pattern, infill pattern with peaks and troughs/valley or alternating convex and concave forms. These open structure layers allow for greater customization and flexibility in the design of the shoe part. By strategically placing and orienting these segments, it is possible to control various aspects such as flexibility, breathability, and overall aesthetics of the shoe. For example, the segments can be arranged in a way that create channels or gaps, which can enhance ventilation and reduce the weight of the shoe, while still maintaining structural integrity.

Furthermore, the open structure layers can be optimized to work in conjunction with the closed loop layers and other materials used in the shoe construction. By carefully designing the open and closed structures in each layer, it is possible to achieve a balance between rigidity and flexibility, as well as between support and comfort. This layered approach enables the creation of shoes that are tailored to specific activities or user needs, providing targeted support, cushioning, or flexibility in key areas.

The present invention is further defined by the following aspects:

1. Method for 3D printing a shoe part (100), preferably a shoe upper, with a plurality of different printing layers (10), the method comprising:
   additively printing the shoe part layer by layer,
   wherein each printing layer (10) defines an outer section (11) of the shoe part, an inner section (12) of the shoe part and an intermediate section (13) which connects the outer section (11) and the inner section (12) by an infill structure (30),
   said infill structure (30) comprising infill connecting lines (31) and/or infill connecting structures (32), characterized in that
   the orientations of the infill connecting lines (31) and/or the infill connecting structures (32) are determined based on the outer section (11) and/or inner section (12) of the shoe part.

2. The method of aspect 1, wherein distinct points on the outer section (11) are constructed as outer points (251) and
   distinct points on the inner section (12) are constructed as inner points (252),
   wherein connecting an outer point (251) with an associated inner point (252) defines the orientation of an infill connecting line (14, 31).

3. The method of any of the preceding aspects, wherein a desired softness/flexibility of the shoe part defines the angles (θ) between the infill connection lines (14, 31) and an axis perpendicular to the outer section (11), wherein the angle (θ) is chosen larger if the softness is desired greater.

4. The method of any of the preceding aspects, wherein the shoe part comprises at least a first region (R1) and a second region (R3) directly adjacent to the first region along the direction of the outer region,
   wherein the angles (θ) between the infill connection lines (14, 31) and an axis perpendicular to the outer section (11) of the first region (R1) are larger than the angles (θ) of the second region (R3), such that first region is softer/more flexible than the second region.

5. The method of aspect 3 or 4, wherein the angles (θ) are in a range between 45° and 75°, more preferably in a range between 55° and 65°.

6. The method of any of the preceding aspects, wherein a flexible filament is used for printing, preferably a thermoplastic material, further preferred Thermoplastic Polyurethane (TPU), Thermoplastic Elastomers (TPE), Polypropylene (PP), Nylon, Flexible Polyurethane, Thermoplastic Copolyester (TPC), and various bio-based polymers.

7. The method of any of the preceding aspects, wherein the orientations of the infill connecting lines (31) and/or connecting structures (32) are constructed on a layer by layer basis, such that an angle (β) between a first infill connecting line of a first layer and a second infill connecting line of a second layer is preferably in the range between 80° and 140°, preferably between 100° and 120°, wherein the first layer is directly adjacent to the second layer.

8. The method of any of the preceding aspects, wherein an infill density is defined by dividing the volume of the printed material by the total volume, wherein the infill density is between 15% and 40%.

9. The method of any of aspect 2 to 8, wherein the outer points (251) are constructed by a projection method, wherein a first point cloud (201) is generated on an outer contour line/surface (200) which is outside of the shoe part and preferably surrounds the part of the shoe part.

10. The method of aspect 9, wherein from each point of the first point cloud (201) a corresponding outer point (251) on the outer section (11) of the shoe part is mapped, wherein the outer contour line (200) of the point cloud (201) is preferably cylindrical/circular.

11. The method of aspect 9 or 10, further comprising using a second point cloud which comprises at least one point, said second point cloud is located adjacent to the inner section (13) external from the intermediate section (13)—virtually inside the shoe, where the space for the foot is-to determine corresponding inner points (252) on inner section (12) of the shoe part.

12. The method of aspect 11, wherein the infill connecting lines (31) connect an outer point (251) across the intermediate section (13) with an inner point (252), wherein the connecting lines (31) between paired points on the shoe model surfaces define an angle (α) of an infill connection line, preferably within the range of 130° to 160°.

13. The method of any of the preceding aspects 2 to 12 comprising the step of generating a plurality of outer points (251) directly on the outer section/surface of the shoe part of a shoe model to determine the orientations of the infill connecting lines (31) and defining key positions across the [outer] shoe structure, with each point of the plurality of first points (251) mapped to a corresponding point on an enlarged or reduced actual shoe model to be printed, thereby adjusting the design to different shoe sizes and shapes.

14. The method of aspect 12, wherein said angle (α) varies across the surface of the shoe model and/or in different layers, preferably in each adjacent layer, each third layer, etc., to achieve a desired stiffness and/or external appearance.

15. The method of any of the preceding aspects, wherein the external appearance of the shoe part (100) is a mesh-like structure, derived from the mapped points and connection lines on its surface.

16. The method of any of the preceding aspects, wherein the outer appearance of the outer section (11) is a mesh like structure.

17. The method of any of the preceding aspects, wherein the printing result of the shoe part (100) is independent of the orientation of the shoe part with regard to an X-Y-base of the 3D printer since the outer and/inner section/surface of the shoe part (100) determine the structure of the infill.

18. The method of any of the preceding aspects, wherein the part of the shoe (100) is a shoe upper, wherein the entire shoe is preferably printed as a single integral part and the method is used for at least the shoe upper, whereas the infill pattern of the remaining parts of the shoe, e.g., the midsole or sole comprises a different, preferably regular infill pattern.

19. The method of any of the preceding aspects, wherein the arrangement of the printed layers includes the periodic introduction of closed layers at intervals ranging from every $2^{nd}$ to every $5^{th}$ layer.

20. The method of any of the preceding aspects, wherein the shoe part incorporates a range of thicknesses from 2 mm to 10 mm, preferably to ensure that the angles of the infill connecting lines can effectively connect to the inner surface.

21. A method for calculating a printing pattern of 3D printing of a part of a shoe, wherein for each layer an outer section (11) of the shoe part and an inner section (12) of said shoe part is calculated and an infill structure (13) between the outer section (11) and inner section (12), wherein the geometry of said infill structure (13) is calculated individually for each layer on the basis of the outer section and (11) the inner section (12) such that the angle ($\alpha$) of an infill connection line (14) is determined by the line of the contour of the outer section (11).

22. A method for 3D printing an (entire) shoe, wherein the method according to aspects 1 to 20 is used to print at least an upper of the shoe.

23. A method for slicing a virtual object of a part of a shoe (100) for generating G-code for 3D printing the part of a shoe with a plurality of different printing layers (10), wherein each calculated sliced layer (10) defines an outer section (11) of the shoe part, an inner section (12) of the shoe part and an intermediate section (13) which connects the outer section (11) and the inner section (12) by an infill structure (30), said infill structure (30) comprising infill connecting lines (31) and/or infill connecting structures (32), characterized in that the orientations of the infill connecting lines (31) and/or the infill connecting structures (32) are determined based on the outer section (11) of the part of the shoe.

24. An apparatus for fabricating a three-dimensional object from a representation of the object stored in memory, the apparatus comprising:

a 3D printing head with a nozzle and an extruder for extruding thermoplastic material;

a control means for 3D printing according to a method according to any of aspects 1-20, wherein the object is a part of a shoe.

25. A shoe part, preferably a shoe upper, produced by 3D printing, particularly according to a method according to any of method aspects 1 to 22, wherein a printed layer (n) comprises an inlayer irregularity; and wherein said printed layer (n) and a directly adjacent printed layer (n+1) provide an inter-layer irregularity.

26. The shoe part according to aspect 25, wherein at least the printed layer (n) and preferably a plurality of printed layers (n, n+1, n+2, . . . ) have an inlayer irregularity in that printed connecting lines exist between two outer points (O1, O2), which are directly neighboring along the outer contour, and gaps without printed connecting lines exist between two neighboring outer points (O2, O3), wherein these outer points (O1, O2, O3) are equidistantly or non-equidistantly spaced along the outer contour, and connecting lines exist between neighboring outer points (O2, O3) to inner neighboring points (I1, I2), respectively, wherein the respective connecting lines are non-parallel.

27. The shoe part according to aspect 25 or 26, wherein at least two directly adjacent printed layers (n, n+1) and preferably a plurality of directly adjacent printed layers (n, n+1, n+2, . . . ) have an interlayer irregularity in that said printed layer (n) comprises a first region (R1) defined along the outer countour, said first region (R1) comprising a plurality of connecting lines which are printed between outer (O1, O2, O3) and inner points (I1, I2), wherein angles between said connecting lines and a normal (n1), which is perpendicular to the outer contour, are all in a range of 40°±15°; and said directly adjacent printed layer (n+1) comprises a second region (R2) defined along the outer contour, said second region (R2) being located directly above or below said first printing region (R1) of the printed layer (n) and having the same dimension as the first region (R1), said second region (R2) comprising a plurality of connecting lines which are printed between outer (O1, O2, O3) and inner points (I1, I2), wherein angles between said connecting lines and a normal (n2), which is perpendicular to the outer contour, are all in a range of −40°±15°.

29. A part of a shoe produced by a 3D printing method according to any of method aspects 1 to 22.

30. A computer program in combination with an apparatus according to aspect 24, said computer program comprising instructions which, when the program is executed by a computer, cause the apparatus to carry out the method according to any of aspects 1 to 22.

31. A computer-readable data carrier comprising instructions which, when executed by a computer of the apparatus according to aspect 24, cause the computer and the apparatus to carry out the method according to any of aspects 1 to 22.

LIST OF REFERENCE SIGNS

1 continuous outer layer
2 continuous inner layer
3 intermediate section
10 printing layer
11 outer section, outer surface
12 inner section, inner surface
13 intermediate section
14 infill connection line
15 outer points
16 outer point
30 infill structure
31 infill connecting line, connection line
32 infill connecting structure, connection structure
100 part of a shoe, shoe part or shoe model
200 outer contour line, outer contour surface, outer template 201 first point cloud, outer point cloud
250 shoe model
251 outer point, point on outer surface, point on outer section
252 inner point, point on inner surface, point on inner section
253 inner cloud point(s), second point cloud, reference point(s)
R1 first region of the shoe upper
n1 normal
R2 second region of the shoe upper
n2 normal

What is claimed is:

1. A method for three-dimensional (3D) printing a shoe part with a plurality of different printed layers, the method comprising:
 a) additively printing the shoe part layer-by-layer,
  wherein the shoe part comprises an outer layer, an inner layer and an intermediate section which connects the outer layer and the inner layer by an infill structure, said infill structure comprising infill connecting lines,
  wherein an infill connecting line of said infill connecting lines connects a point on the outer layer to a point on the inner layer,
  wherein orientations of at least some of the infill connecting lines are determined at least in part based on one or more contours of the outer layer, the inner layer, or both, and
  wherein an angle between at least some of the infill connecting lines and an axis perpendicular to the outer layer is determined based at least in part on a softness or flexibility of the shoe part.

2. The method of claim 1, wherein the shoe part is a shoe upper.

3. The method of claim 1, wherein distinct points on the outer layer are constructed as outer points and distinct points on the inner layer are constructed as inner points, wherein connecting an outer point with an associated inner point defines the orientation of at least one infill connecting line.

4. The method of claim 1, wherein the angle is larger when the desired softness or flexibility is greater.

5. The method of claim 4, wherein the shoe part comprises at least a first region and a second region directly adjacent to the first region along the direction of the outer layer, wherein the angles between the infill connecting lines and an axis perpendicular to the outer layer of the first region are larger than the angles of the second region, such that the first region is softer or more flexible than the second region.

6. The method of claim 1, wherein at least some of the infill connecting lines are straight.

7. The method of claim 1, wherein at least some of the infill connecting lines are curved.

8. The method of claim 1, wherein the infill structure for a layer of the shoe part comprises a regular pattern determined at least in part based on one or more contours of the outer layer, the inner layer, or both.

9. The method of claim 1, wherein the infill structure for a layer of the shoe part comprises an irregular pattern determined at least in part based a plurality of contours of the outer layer, the inner layer, or both.

10. The method of claim 1, wherein the 3D printing comprises extrusion printing, and wherein a flexible filament is used for the extrusion printing.

11. The method of claim 10, wherein the flexible filament comprises a thermoplastic material.

12. The method of claim 11, wherein the shoe part or the outer layer comprises a mesh structure.

13. The method of claim 1, wherein the orientations of the infill connecting lines are constructed on a layer by layer basis, such that an angle between a first infill connecting line of a first layer and a second infill connecting line of a second layer is between 80° and 140°, wherein the first layer is directly adjacent to the second layer.

14. The method of claim 13, wherein the angle between a first infill connecting line of a first layer and a second infill connecting line of a second layer is between 100°' and 120°.

15. The method of claim 3, wherein the outer points are constructed by a projection method, wherein a first point cloud is generated on an outer contour line or surface which is outside of the shoe part and surrounds the shoe part.

16. The method of claim 15, further comprising mapping from each point of the first point cloud a corresponding outer point on the outer layer of the shoe part.

17. The method of claim 15, wherein the outer contour line or surface of the first point cloud is cylindrical or circular.

18. The method of claim 3, further comprising generating the outer points directly on the outer layer of the shoe part of a shoe model to determine the orientations of the infill connecting lines, wherein each point is mapped to a corresponding point on an enlarged or reduced shoe model to be printed, thereby adjusting the design to different shoe sizes.

19. The method of claim 1, wherein the printing result of the shoe part is independent of the orientation of the shoe part with regard to an X-Y-base of a 3D printer configured to perform the method.

20. The method of claim 1, wherein the printed layers comprise at least one dosed layer at an interval from every 2nd to every 5th layer.

21. The method of claim 1, wherein a printed layer (n) of the shoe part comprises an inlayer irregularity, or wherein said printed layer (n) and a directly adjacent printed layer (n+1) form an inter-layer irregularity.

22. The method of claim 21, wherein at least the printed layer (n) comprises an inlayer irregularity such that printed connecting lines exist between two outer points (O1, O2), which are directly neighboring along a contour of the outer layer, and gaps without printed connecting lines exist between two neighboring outer points (O2, O3), and connecting lines exist between neighboring outer points (O2, O3) to inner neighboring points (I1, I2), respectively, wherein the respective connecting lines are non-parallel.

23. The method of claim 21, wherein at least two directly adjacent printed layers (n, n+1) comprise an interlayer irregularity such that said printed layer (n) comprises a first region defined along a contour of the outer layer, said first region comprising a plurality of connecting lines printed between outer (O1, O2, O3) and inner points (I1, I2), wherein angles between said connecting lines and a normal (n1), which is perpendicular to the contour of the outer layer, are all in a range of 50°+15°; and said directly adjacent printed layer (n+1) comprises a second region defined along the contour of the outer layer, said second region directly above or below said first region of the printed layer (n) and having the same dimension as the first region, said second region comprising a plurality of connecting lines which are printed between outer (O1, O2, O3) and inner points (I1, I2), wherein angles between said connecting lines and a normal (n2), which is perpendicular to the contour of the outer layer, are all in a range of −50°±15°.

24. A method for 3D printing an entire shoe with a plurality of different printed layers, the method comprising additively printing the shoe layer-by-layer, wherein each printed layer defines an outer layer of the shoe, an inner layer of the shoe and an intermediate section which connects the outer layer and the inner layer by an infill structure, said infill structure comprising infill connecting lines, wherein at least some of the infill connecting lines each connect a point on the outer layer to a point on the inner layer, and wherein orientations of at least some of the infill connecting lines are determined at least in part based on one or more contours of the outer layer, the inner layer, or both.

25. An apparatus for three-dimensional (3D) printing an object with a plurality of different printed layers from a representation of the object stored in memory, the apparatus comprising:

a) a 3D printing head with a nozzle and an extruder for extruding thermoplastic material; and b) a processor configured to perform 3D printing operations comprising additively printing the object layer-by-layer, wherein the object comprises an outer layer, an inner layer and an intermediate section which connects the outer layer and the inner layer by an infill structure, said infill structure comprising infill connecting lines, wherein at least some of the infill connecting lines each connect a point on the outer layer to a point on the inner layer, wherein orientations of at least some of the infill connecting lines are determined at least in part based on one or more contours of the outer layer, the inner layer, or both, and wherein an angle between at least some of the infill connecting lines and an axis perpendicular to the outer layer is determined based at least in part on a softness or flexibility of the object.

26. The apparatus of claim 25, wherein the object is a part of a shoe or a shoe.

27. The apparatus of claim 25, wherein at least some of the infill connecting lines are straight.

28. The apparatus of claim 25, wherein at least some of the infill connecting lines are curved.

29. The apparatus of claim 25, wherein the infill structure for a layer of the object comprises a regular pattern determined based at least in part on one or more contours of the outer layer, the inner layer, or both.

30. The apparatus of claim 25, wherein the infill structure for a layer of the object comprises an irregular pattern determined based at least in part on a plurality of contours of the outer layer, the inner layer, or both.

* * * * *